(12) United States Patent
Bouvet et al.

(10) Patent No.: US 10,412,216 B2
(45) Date of Patent: Sep. 10, 2019

(54) DEVICE AND METHOD FOR PROCESSING A COMMUNICATION

(71) Applicant: Orange, Paris (FR)

(72) Inventors: Bertrand Bouvet, Perros-Guirec (FR); François Toutain, Louannec (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/179,905

(22) Filed: Jun. 10, 2016

(65) Prior Publication Data

US 2016/0366276 A1 Dec. 15, 2016

(30) Foreign Application Priority Data

Jun. 12, 2015 (FR) ..................... 15 55354
Dec. 17, 2015 (FR) ..................... 15 62710

(51) Int. Cl.
*H04M 3/436* (2006.01)
*H04M 1/667* (2006.01)
(Continued)

(52) U.S. Cl.
CPC ........ *H04M 3/436* (2013.01); *H04L 65/1006* (2013.01); *H04M 1/667* (2013.01);
(Continued)

(58) Field of Classification Search
CPC .............. H04L 65/1006; H04M 1/667; H04M 3/42008; H04M 3/42059
(Continued)

(56) References Cited

U.S. PATENT DOCUMENTS

2003/0154400 A1\* 8/2003 Pirttimaa ................ H04L 29/06
726/14
2007/0039040 A1 2/2007 McRae et al.
(Continued)

FOREIGN PATENT DOCUMENTS

EP 1 675 333 A1 6/2006

OTHER PUBLICATIONS

Rosenberg et al. Mar. 6, 2006. The session initiation protocol (SIP) and spam draft-ietf-sipping-spam-02. Internet citation. Retrieved Jun. 7, 2007 from URL:http://tools.ietf.org.html/draft-ietf-sipping-spam-02.
(Continued)

*Primary Examiner* — Said M Elnoubi
(74) *Attorney, Agent, or Firm* — Knobbe, Martens, Olson & Bear, LLP

(57) ABSTRACT

One embodiment relates to a processing method for a communication intended for at least one receiving terminal. The method may comprise receiving a communication intended for the at least one receiving terminal and obtaining a certified identifier and an uncertified identifier of a sender of the communication, the identifiers being comprised in a signal message for the communication. The method may further comprise comparing the certified identifier with the uncertified identifier and processing the communication including a process for searching for the certified identifier in a list containing certified identifiers for senders associated with uncertified identifiers of those senders; the processing process being based on the results of the comparison process and the searching process.

18 Claims, 4 Drawing Sheets

(51) Int. Cl.
  *H04L 29/06* (2006.01)
  *H04M 3/42* (2006.01)
  *H04W 4/16* (2009.01)
  *H04W 8/18* (2009.01)
  *H04M 1/57* (2006.01)

(52) U.S. Cl.
  CPC ... *H04M 3/42008* (2013.01); *H04M 3/42059* (2013.01); *H04W 4/16* (2013.01); *H04W 8/186* (2013.01); *H04M 1/57* (2013.01); *H04M 2201/18* (2013.01); *H04M 2203/6045* (2013.01)

(58) Field of Classification Search
  USPC ......................................................... 455/415
  See application file for complete search history.

(56) References Cited

U.S. PATENT DOCUMENTS

| | | | |
|---|---|---|---|
| 2007/0150773 A1 | 6/2007 | Srivastava | |
| 2009/0067410 A1* | 3/2009 | Sterman | H04L 29/06027 370/352 |
| 2013/0152153 A1* | 6/2013 | Weiser | H04L 63/0236 726/1 |
| 2015/0229609 A1* | 8/2015 | Chien | H04L 63/101 726/13 |

OTHER PUBLICATIONS

French Search Report dated Apr. 13, 2016 for French Application No. FR 1555354 filed Jun. 12, 2015, 3 pages.

* cited by examiner

DEVICE AND METHOD FOR PROCESSING A COMMUNICATION

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. In particular, the disclosure of French Patent Application FR 1555354 filed Jun. 12, 2015, and French Patent Application FR 1562710 filed Dec. 17, 2015, are incorporated herein by reference in their entireties.

BACKGROUND OF THE INVENTION

Field of the Invention

Some embodiments relate to the general field of telecommunications.

In particular, some embodiments relate to the field of processing communications for the purpose of filtering, and in particular telephone calls, calls placed as part of a videoconference, instant messaging communications, text messages (SMS) or multimedia messages (MMS).

Description of the Related Art

In the current state of the art, call filtering methods exist by blacklists. These blacklists contain telephone numbers from unwanted callers and make it possible to filter an unwanted call based on the caller's telephone number. It is also possible to block calls whereof the telephone numbers are hidden.

White list filtering methods also exist in which all telephone calls are filtered except telephone calls whereof the caller's telephone number belongs to the white list.

Some telecommunications operators further offer an identification service for hidden calls making it possible to filter hidden calls before they are presented to the recipient. Thus, in the case of the "stop secret" service developed by Orange (registered trademark), a caller whose telephone number is hidden is connected to a server asking him to identify himself vocally. If the caller does not provide voice identification, the call is not put through to the recipient.

Unfortunately, these filtering procedures based on voice identification or lists have faults.

Some call centers have set up a practice consisting of falsifying their telephone number when placing their telephone calls, so that in fine the blacklist or voice identification methods are ineffective.

Furthermore, establishing a white list is a long and tedious operation, since it requires inventorying all of the telephone numbers of callers from whom one wishes to receive calls. Thus, if one wishes to be able to receive all calls from a particular company, it is necessary to exhaustively list all of the numbers used by all of the extensions within that company.

There is therefore a need for a simple and effective solution making it possible on the one hand to improve the effectiveness of the filtering of communications and on the other hand to improve the associated user experience.

SUMMARY OF THE INVENTION

Some embodiments meet this need by providing, according to a first aspect, a processing method for a communication intended for at least one receiving terminal, this method comprising:

receiving a communication intended for this receiving terminal;

obtaining an uncertified identifier of a sender of the communication included in a signal message for said communication and a piece of reliability information;

comparing the reliability information with the uncertified identifier; and processing the communication based on the result of this comparison process.

Correlatively, some embodiments also relate to a device for processing a communication intended for at least one receiving terminal, this device comprising:

a module for receiving a communication intended for said at least one receiving terminal;

a module for obtaining, in a signal message of the communication, an uncertified identifier of a sender of said communication and a piece of reliability information;

a module for comparing the reliability information with the uncertified identifier; and a module for processing the communication based on the result of the comparison process.

As used herein, the expression "communication" is used indifferently to refer to a telephone call or a video conference call, or more broadly any communication service such as SMS communication services or instant messaging communication services.

In one particular embodiment, the reliability information is a certified identifier comprised in the signal message of the communication.

A certified identifier is an identifier whereof the value and integrity are guaranteed by the operators of the networks through which the communication passes and that is recognized as such in a signal message of the communication. A certified identifier may also be an identifier whose value and integrity are guaranteed by a service provider or a server of a trusted third party.

A piece of reliability information may alternatively correspond to data, for example relative to earlier communications.

If the piece of reliability information is a certified identifier, it is for example found in a particular dedicated field of a signal message of the communication. In other words, the network operators or service providers of the OTT (Over The Top) type are, with respect to the user of the receiving terminal, trusted third parties to establish the certified identifier and guarantee the value of that certified identifier when it is transmitted by the signal to the recipient. Such a certified identifier therefore cannot be falsified by the caller, since it is inserted in each communication, by the network operator or the service provider responsible for the caller or through a trusted third party (for example, Web Real-Time communication (WebRTC) identified and authenticated by a trusted third party).

The signal message of the communication may therefore include a non-certified identifier that may be presented to the receiving terminal(s) as part of a caller number or identity display service and a certified identifier managed by the communication network and that is not intended to be displayed to the users of the receiving terminals.

It should be noted that such a certified identifier is present in certain communication signals. For example, the signal messages according to the SIP standard (defined by Internet Engineering Task Force (IETF) documents IETF RFC 3261 and IETF RFC 3325 or by one of their updates) include a PAI (P_Asserted_Id) field containing a certified identifier of the caller in addition to the FROM field that may be displayed on the receiving terminal(s) as part of a caller number display service.

In one particular embodiment, the processing process includes a sub-process for filtering the communication.

Some embodiments thus propose to filter (i.e., transmit or block) a communication based on the comparison between the reliability information and the uncertified identifier of the sender. This reliability information advantageously guarantees the identification of the caller truly at the source of the communication.

In one particular embodiment:

the processing process includes a sub-process for looking for the reliability information in a list containing reliability information for senders associated with uncertified identifiers of those senders; and the filtering sub-process is carried out based on this search sub-process.

Thus, some embodiments also propose to filter a communication based on whether it belongs to a list of the reliability information.

In one particular embodiment, the processing process includes:

a sub-process for providing notification of at least one characteristic of the communication as a function of the comparison process and/or the result of the process for searching for said reliability information in a list containing reliability information for senders associated with uncertified identifiers of those senders.

Some embodiments thus also provide means for simply informing the recipient of the nature of the communication, and in particular the likelihood that this communication is "safe", and thus encouraging the recipient to accept or reject the communication (answer a telephone call, not open a suspicious SMS or e-mail, etc.).

In one particular embodiment, the processing process takes the type of communication into account.

Thus and advantageously, the filtering may or may not be done based on the type of communication, for example depending on whether this communication is a telephone call, a text message or a videoconference.

Some embodiments also provide, according to a second aspect, a method for updating a list for filtering communications intended for at least one receiving terminal, this method comprising:

receiving a communication intended for the receiving terminal;

obtaining an uncertified identifier of a sender of the communication included in a signal message for the communication and a piece of reliability information; and on request by a user, making an addition to or deletion from the list of reliability information associated with the uncertified identifier.

Correlatively, some embodiments also relate to a device for updating a list for filtering communications intended for at least one receiving terminal, this device comprising:

a module for receiving a communication intended for the receiving terminal;

a module for obtaining an uncertified identifier of the sender at the source of the communication included in a signal message for the communication and a piece of reliability information;

on request by a user, a module for making an addition to or deletion from the list of reliability information associated with the uncertified identifier.

Thus, some embodiments allow a user to dynamically build a list for filtering communications, this list including not only the uncertified identifiers of the caller displayed on the recipient terminals as in the state of the art, but also the identifiers certified by the operators of networks or service providers of the OTT type.

One skilled in the art will understand below that this list, primarily used for filtering (hence its name), is also used as a parameter for the notification process, including when the processing process does not perform filtering.

In one particular embodiment, the processing method includes a preliminary process for registering, in a list, certified identifiers for senders associated with uncertified identifiers of those senders.

In this embodiment, each pair of certified and uncertified identifiers associated which each sender having issuing a communication is registered in the list.

In one particular embodiment, the registering process is made by the user thanks to the uncertified identifier.

In this embodiment, the user for example decides to take the call and discovers that it is a call from a call center from which he no longer wishes to receive calls in the future.

The user then consults the log of calls from the terminal, selects the call he has just received from the uncertified identifier displayed to him and updates the list indicating that he no longer wishes to receive telephone calls from this caller.

The update device thus adds the certified identifier to the list, associated with the uncertified identifier.

In one particular embodiment, the reliability information is a certified identifier comprised in the signal message of the communication.

Advantageously, when the reliability information is an identifier certified by the network operators or service providers, it cannot be falsified by callers. Some embodiments thus make it possible to improve the effectiveness of the list-based filtering methods existing in the state of the art.

Associating the reliability and the non-certified identifiers in the list makes it possible for the user to modify this list later by using only the non-certified identifier of the caller.

In one particular embodiment, the user's request follows a display of the caller's identifier on at least one terminal of the call recipient.

In other words, the user's request follows the traditional display of the caller's number. The implementation of this embodiment is thus advantageously transparent for the user of the receiving terminal.

In one particular embodiment, the list is a blacklist.

Such a blacklist thus gathers, in a same computer structure, the certified and noncertified identifiers of callers from whom the user of the receiving terminal does not wish to receive communications.

This embodiments makes it possible to block a communication, the latter not being conveyed to the receiving terminal, if the reliability information comprised in a signal message is comprised in this blacklist.

Owing to the filtering done based on a piece of reliability information, the existing blacklist-based filtering methods are thus improved by blocking unwanted calls even if the identification of the caller intended to be displayed on the recipient terminal has been falsified.

In another embodiment, the process for adding the reliability information and the noncertified identifier to the blacklist is only carried out if the reliability information is a certified identifier comprised in the signal message of the communication and this certified identifier is different from the noncertified identifier.

Thus, by comparing the call identifier that may be displayed and the value of which is not guaranteed with the caller identifier certified by the network operators or service providers, the device for updating the list may detect possible attempts at falsification of the caller's identification to be displayed on the recipient terminal, this detection authorizing the processes for adding the certified identifier to the filtering blacklist.

Advantageously, some embodiments may thus be implemented to block only communications for which a falsification of the caller's identification is detected.

In one particular embodiment, the list is a white list.

Such a white list thus gathers, in a same computer structure, the reliability information and the noncertified identifiers of callers from whom the user of the receiving terminal wishes to receive communications.

In this embodiment, the call is transferred to the recipient terminal if a piece of reliability information is listed in this white list.

In one particular embodiment in which the reliability information is a certified identifier, this identifier certified by the operator or service provider identifies a range of extension numbers assigned by the network operator to a PBX (Private Automatic Branch eXchange) for example associated with a company. Such a certified identifier thus makes it possible to identify not a particular extension number of the company, but all of the extensions of the company.

Some embodiments thus facilitate the user experience for the user of the white list-based filtering method by allowing him to use a white list in which all of the extensions associated with a PBX are accessible through a single piece of reliability information.

Associated with the reliability information and the noncertified identifiers, it is in particular possible to add to the list:
 the type of communication (telephone call, instant messaging, etc.);
 and/or the identifier of the recipient terminal.

This additional information makes it possible to perform conditional filtering: filtering of telephone calls for some terminals, blocking videoconference for all terminals, receiving SMS messages for all terminals, etc.

In one particular embodiment, the reliability information is a certified identifier, and more particularly a PAI (P_Asserted_Id) identifier according to the SIP (Session Initiation Protocol) protocol or an NDI (Installation Designation Number) identifier according to the ISUP protocol (or ISDN, Integrated Services Digital Network).

In another particular embodiment, said noncertified identifier is a FROM identifier according to the SIP protocol or an NDS (Additional Designation Number) identifier according to the ISUP protocol.

Some embodiments are thus compatible with the use of the SIP standards (defined by documents IETF RFC 3261 and IETF RFC 3325 or by one of their updates) and ISDN standards (defined by document Q.931 by the ITU (International Telecommunications Union) or one of its updates).

In one particular embodiment, the processes of the processing method and/or the processes of the update method are determined by computer program instructions.

Consequently, some embodiments relate to a computer program on an information medium, this program being able to be implemented in a communication terminal, a residential gateway, or a piece of network equipment, this program including instructions suitable for carrying out the processes of a processing method and/or an update method as described above.

This program may use any programming language, and be in the form of source code, object code, or code midway between source code and object code, such as a partially compiled form, or in any other desirable form.

Some embodiments also relate to an information medium readable by a computer, and including instructions from a computer program as set out above.

The computer medium may be any entity or device capable of storing the program. For example, the medium may include a storage means or component, such as a ROM, RAM, PROM, EPROM, CD-ROM, or a magnetic recording means or component, for example a floppy disk or hard disk.

Furthermore, the information medium may be a transmissible medium such as an electrical or optical signal, which may be conveyed via an electric or optical cable, by radio or by other means. The program may in particular be downloaded on a network of the Internet type.

Alternatively, the information medium may be an integrated circuit in which the program is incorporated, the circuit being suitable for executing or being used in the execution of the method in question.

BRIEF DESCRIPTION OF THE DRAWINGS

Specific features and advantages of the embodiments exemplified herein will emerge from the detailed description done in reference to the figures, in which.

DETAILED DESCRIPTION OF THE PREFERRED EMBODIMENT

Figure 1:
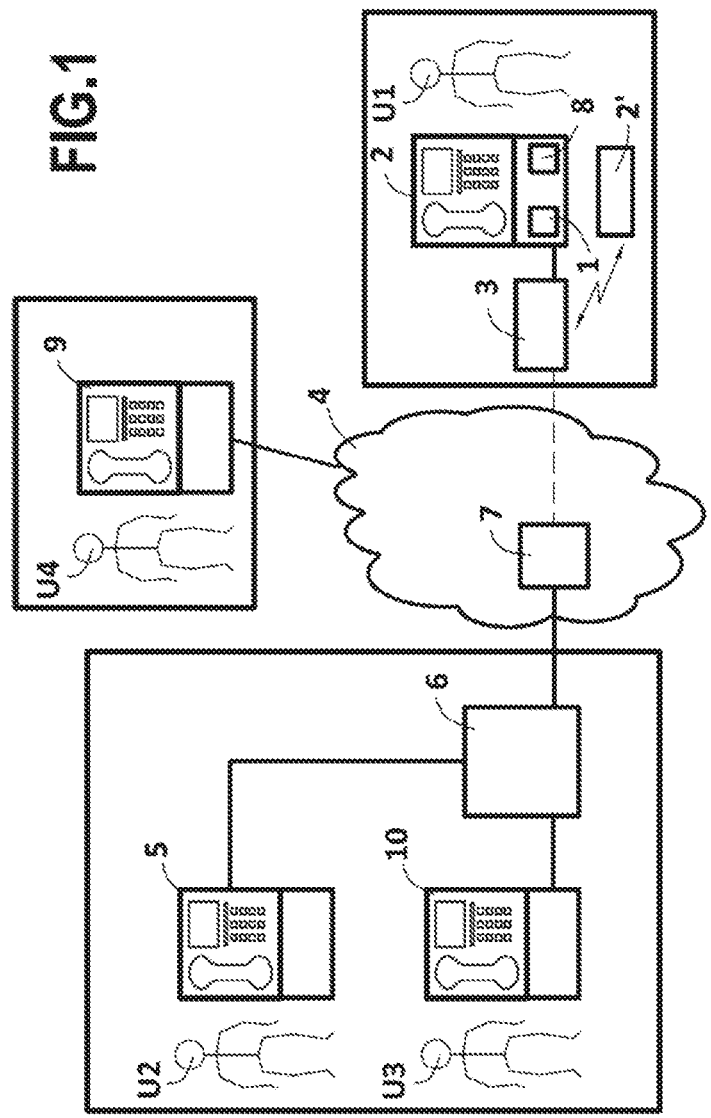
FIG. 1 shows, in their environment, a device for processing communications and an update device according to one particular embodiment.

FIG. 1 shows, in its environment, a device 1 for processing communications intended for two communication terminals 2 and 2'.

In the embodiment described herein, the processing device makes it possible to filter communications and notify the user of a degree of certification of the communication.

In the embodiment described herein, the reliability information is a certified identifier P_Asserted_Id (PAI) according to the SIP protocol (Session Initiation Protocol).

In this embodiment, the filtering uses a blacklist L, this list gathering certified identifiers associated with noncertified identifiers and, for each of these pairs, the type of communications that must be blocked for each of the terminals 2 and 2' when the signal message for this communication includes the corresponding certified identifier.

In the example considered herein, the blacklist L contains the certified identifier of the line connecting the terminal 9 of the user U4 to the network 4, this certified identifier being associated with SMS and instant messaging communications.

The communication terminal 2 is, in the example illustrated in FIG. 1, a landline telephone allowing the user U1, as part of a subscription with a network operator, to access services of a communication network 4 via a residential gateway 3.

In this embodiment, the processing device 1 and the list L are incorporated in the terminal 2. Alternatively, they may be incorporated into the residential gateway 3 or a piece of equipment of the network 4.

In the example illustrated in FIG. 1, the communication terminal 2' is a mobile smartphone provided with communication software. The smartphone 2' communicates with the residential gateway 3 using wireless connection means or components, for example by WiFi. The communication software allows the smartphone 2' to register itself with a server of the communication network 4 in order to access, via the residential gateway 3, the services subscribed for by the user U1.

In other words, the user U1 has two communication terminals 2 and 2', called recipient terminals, that are connected to the residential gateway 3 and that are accessible by a same public identity, in the case at hand the number, of the telephone line to which the residential gateway 3 is connected.

In particular, the user U1 may be informed simultaneously on the terminals 2 and 2' of telephone calls coming from the terminals 5, 9 and 10 of the users U2, U4 and U3. The communications network 4 may be a mobile network (e.g., UMTS (Universal Mobile Telecommunications System)) or a wired network (e.g., RTC, VoIP DSL, Fiber, Cable), wired or wireless (e.g., WLAN (Wireless Local Area Network)), private or public, etc.

In the example considered herein, it is assumed that the architecture of the network 4 is an IMS (IP Multimedia Subsystem) architecture.

It is further assumed that the user U2 is an employee of a call center who has a communication terminal 5 making it possible to establish telephone calls by using a call signal according to the SIP protocol as defined in IETF standards RFC 3261 and RFC 3325.

Traditionally, the operator of the network 4 has assigned a section of call numbers to the call center. The first number in the section of numbers here corresponds to the number of the telephone switchboard for the call center and making it possible to identify the physical line connecting the call center to the communications network 4. The other numbers of the section of numbers assigned to the call center are assigned to the communication terminals, including the terminals 5 and 10, belonging to the call center.

In the example described herein, it is assumed that the operator of the network 4 has assigned the section of one hundred numbers 01 23 45 00-01 23 45 99 to the call center. In other words, the number for the switchboard of the call center is 01 23 45 00 and the number for communication terminal 5 is 01 23 45 05.

It is also assumed that the user U2 initiates, from his communication terminal 5, a telephone call intended for terminals 2 and 2' of the user U1 accessible by the telephone number associated with the telephone line to which the residential gateway 3 is connected.

The communication terminal 5 then sends the residential gateway 3 a call signal message M1 of the SIP INVITE type including a field of the FROM type, the content and integrity of which are not certified by the network 4. This FROM-type field contains the telephone number of the extension (for example, 01 23 45 05) assigned to the communication terminal 5.

The call signal message M1 is first received by a piece of PBX equipment 6 (Private Automatic Branch eXchange) located on the premises of the call center. The PBX equipment 6 allows the communication terminals 5 and 10 to access the network 4.

It is assumed here that the PBX equipment 6 is configured to modify the FROM field of the message M1 such that this field contains a telephone number that does not belong to the section of consecutive numbers assigned to the call center.

In other words, the PBX equipment 6 replaces the number 01 23 45 05 contained in the FROM field with another number, for example the number 03 45 67 89.

The PBX equipment 6 may also configure the message M1 so that it contains a PAI (P_Asserted_Id) field according to the SIP protocol and in the field of which the value of the FROM field has been copied.

Then, the piece of PBX equipment 6 sends the message M1 to a first piece of equipment 7 under the oversight of the operator of the communications network 4.

In the example considered herein, the piece of equipment 7 is P-CSCF (Proxy Call/Session Control Function) equipment.

This P-CSCF equipment 7 verifies whether the message M1 contains a PAI field. If applicable, the P-CSCF equipment 7 modifies the PAI field such that it contains the number of the physical line (i.e., the switchboard number) connecting the call center to the communication network 4. If the message M1 does not contain a PAI field, the P-CSCF equipment 7 creates one for it and assigns it the number of the physical line connecting the call center to the communication network 4.

In other words, the P-CSCF equipment 7 configures the PAI field so that it contains a certified identifier whose value is the number 01 23 45 00 identifying the physical line connecting the call center to the communication network 4.

According to the SIP protocol, the P-CSCF equipment 7 does not look at or modify the value contained in the FROM field.

The message M1 is next sent by the P-CSCF equipment 7 to the recipient terminal 2' through the communication network 4 and the residential gateway 3.

The communication network 4 also sends a signal message M2 of the call to the recipient terminal 2' through the residential gateway 3.

During its transmission in the communication network 4 and through the residential gateway 3, the operator of the network 4 guarantees, according to the SIP standard, the integrity and value of the PAI field of the message M1 and the message M2. However, the operator of the network 4 does not guarantee the integrity of the FROM field. In other words, the PAI field of the message M1 is a certified identifier of the caller and the FROM field is a non-certified identifier of the caller.

The terminals 2 and 2' may notify the user U2 of the degree of certification of the call when it is transmitted to them.

Figure 3:
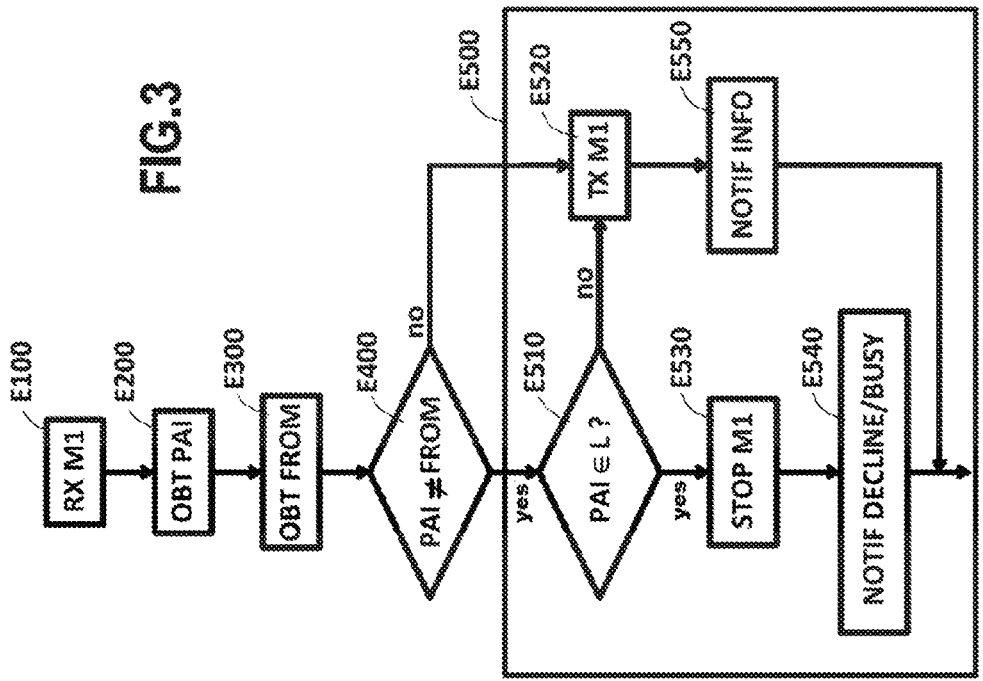
FIG. 3 shows, in flowchart form, the main processes of a processing method in an alternative embodiment in which the list is a blacklist.

We will now describe, in reference to FIG. 3, the main processes of an exemplary processing method during the reception, by the processing device 1, of a telephone call emitted by the user U2. During a process E100, the device 1 receives the call signal message M1 indicating that the user U2 wishes to establish a telephone call with the terminal 2 of the user U1.

Likewise, the smartphone 2' displays the communication (for example by ringing) to the user U1 upon receiving the call signal message M2.

The device 1 analyzes the message M1 and obtains a certified identifier (process E200) and a non-certified identifier (process E300) of the caller at the source of the call by extracting the identifier contained in the PAI field and the identifier contained in the FROM field from the call signal message M1. The identifier contained in the PAI field constitutes, as previously emphasized, an identifier certified by the communication network 4.

The device 1 next compares (process E400) the certified PAI identifier taken from the message M1 with the noncertified FROM identifier, and based on the result, performs a processing process (E500) comprising several sub-processes (E510 to E550).

If the certified identifier is different from the noncertified identifier (yes response in process E400), then the device 1 compares (process E510) the certified PAI identifier taken from the message M1 with the certified identifiers listed in the blacklist L.

If the PAI identifier corresponds to a certified identifier listed in the blacklist L (yes response in process E510), the device 1 blocks (process E530) the call intended for the terminal 2.

Alternatively, during process E510, it is also verified whether the certified identifier listed in the blacklist L is also associated with the "telephone call" communication type. If so, the device 1 blocks (process E530) the call intended for the terminal 2. According to this alternative, if the certified identifier present in the blacklist L is associated with a communication type, for example text message, different from the type of the communication received in process E100 (in the case at hand, the type of communication is a telephone call), the device 1 does not block the call intended for the terminal 2.

Alternatively, the device 1 blocks the call intended for the terminal 2 when the FROM and PAI identifiers are different, whether or not the PAI identifier corresponds to a certified identifier listed in the blacklist L, process E510 then not being carried out.

In the embodiment described herein, when the device 1 blocks the call intended for the terminal 2, during a process E540, the device 1 sends a request to reject the telephone call.

In the example described herein, the device 1 sends, via the communication network 4, a SIP request from series 6XX, typically a 603 DECLINE request, to the terminal 5. Upon receiving this 603 DECLINE request, the communication network 4 notifies the recipient terminal 2', via the residential gateway 3, that the communication sent by the terminal 5 of the user U2 has been rejected by the terminal 2 of the user U1. Upon receiving this notification, the terminal 2 ceases to display the communication to the user U1.

Alternatively, the device 1 sends, via the communication network 4, a SIP request from series 4XX, typically a 406 BUSY HERE request, to the terminal 5.

Upon receiving this 406 BUSY HERE request, the communication network 4 does not notify the recipient terminal 2', via the residential gateway 3, that the communication sent by the terminal 5 of the user U2 has been rejected by the user U1 In other words, the terminal 2 continues to display the communication to the user U1.

If the PAI identifier does not correspond to a listed certified identifier associated with the "telephone call" communication type in the blacklist L (no response in process E510), the device 1 sends the message M1 (process E520) to the terminal 2 so that the call will be displayed to the user of the receiving terminal 2.

If the PAI identifier is identical to the FROM identifier, the device 1 also sends the message M1 (process E520) to the terminal 2 so that the call will be displayed to the user.

In both of these last two cases where the call is displayed to the user, the device 1 carries out a notification process (E550) making it possible to provide information to this user on the communication, and more particularly on its certification.

This notification process (E550) is optional.

Figure 6:
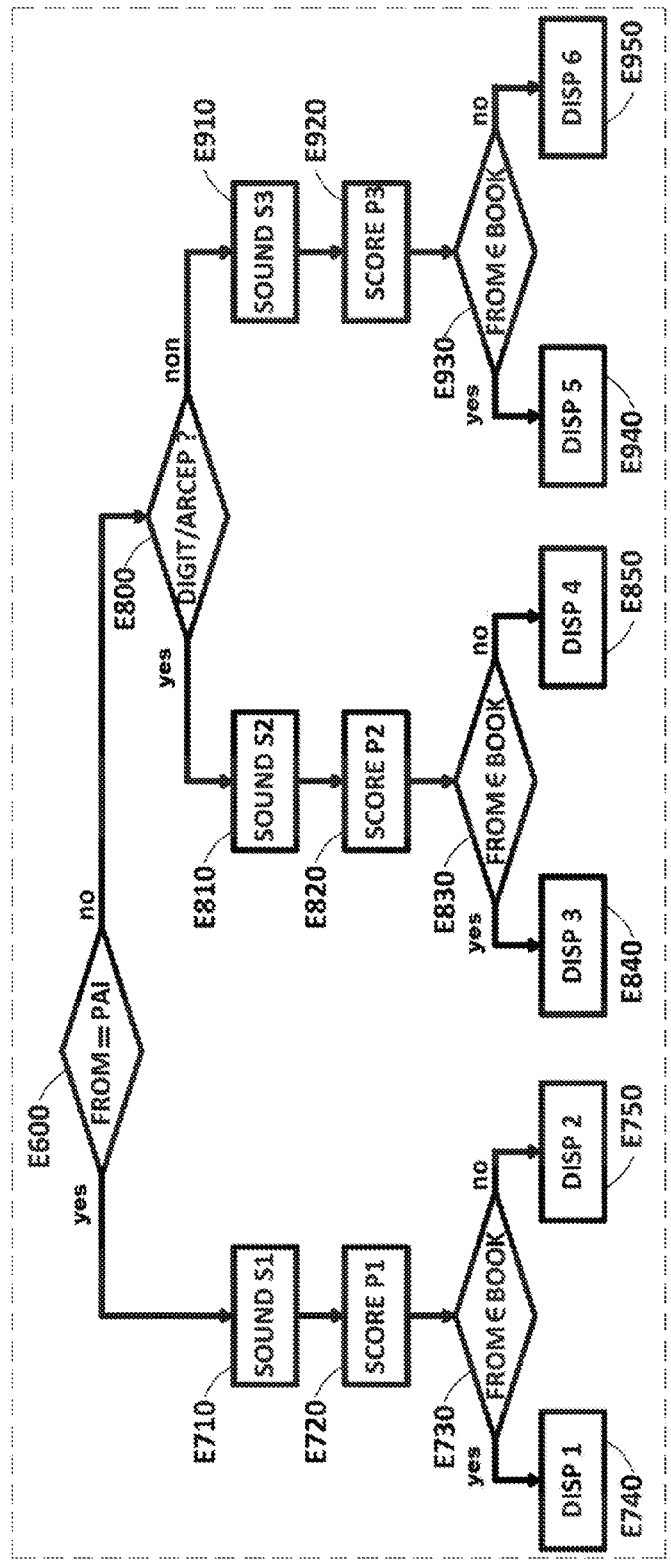
FIG. 6 shows the various sub-processes of the notification process of the processing method.

This notification process can be broken down into a series of sub-processes (E600 to E960) shown in FIG. 6.

In this embodiment, three tests are carried out: it is verified whether the PAI and FROM identifiers are identical (E600). If they are different, it is verified whether their first digits are identical or whether the FROM is in accordance with the ARCEP ("Autorité de Régulation des Communications Electroniques et des Postes", i.e. Regulating Authority for Electronics Communications and Extensions) plan (E800).

Lastly, it is verified whether the FROM identifier is present in an address book BOOK recorded in the terminal 2 (E730, E830, E930).

Based on the result of these tests, the recipient terminal 2 can play a specific ring tone, display a likelihood that the calling number corresponding to the FROM identifier is certified, or display this number in a certain typography or color.

For example, in this embodiment, a first test (E600) compares the noncertified FROM identifier and the certified PAI identifier.

If these identifiers are identical, the terminal 2 plays a specific ring tone S1 (E710), then displays (E720) a likelihood P1 that the calling number is certified.

Next, it is verified (E730) whether the FROM identifier is present in the address book BOOK of the terminal 2. If not, the FROM identifier is displayed (E750) in a specific color and typography showing that the latter is certified, for example green and with a first typography.

If the FROM identifier is present in the address book, the contact associated with that identifier can be displayed (E740) directly, for example the last name and/or first name of the contact, but still in the same color and the same typography.

If the FROM and PAI identifiers are different, their first digits are compared or it is verified whether the FROM identifier is according to the ARCEP plan (E800).

If so or if the first digits are identical, a specific ring tone S2 is played (E810), then a likelihood P2 is displayed (E820) that the calling number is certified.

Next, it is verified (E830) whether the FROM identifier is present in the address book BOOK of the terminal 2. If not, the FROM identifier is displayed (E850) in a specific color and typography showing that the latter is not certified but has a compliant format, for example orange and with a second typography.

If the FROM identifier is present in the address book, the contact associated with that identifier can be displayed (E840) directly, for example the last name and/or first name of the contact, but still in the same color and the same typography.

If the first digits are different or if the FROM identifier is not compliant with the ARCEP plan, a specific ring tone S3 is played (E910), then a likelihood P3 is displayed (E920) that the calling number is not certified.

Next, it is verified (E930) whether the FROM identifier is present in the address book BOOK of the terminal 2. If not, the FROM identifier is displayed (E950) in a specific color and typography showing that the latter is not certified and does not have a compliant format, for example red and with a third typography.

If the FROM identifier is present in the address book, the contact associated with that identifier can be displayed (E940) directly, for example the last name and/or first name of the contact, but still in the same color and the same typography.

In one particular embodiment, the user U1 can enrich the address book BOOK of the device 1 from information in the incoming call log to store both the FROM identifier and the PAI identifier.

Thus, in the case of a usurpation of identity for which the FROM identifier is in the ARCEP format and is present in the address book but is different from the PAI, the user U1 may be notified of this usurpation, for example by a specific ring tone or visual information.

Figure 5:
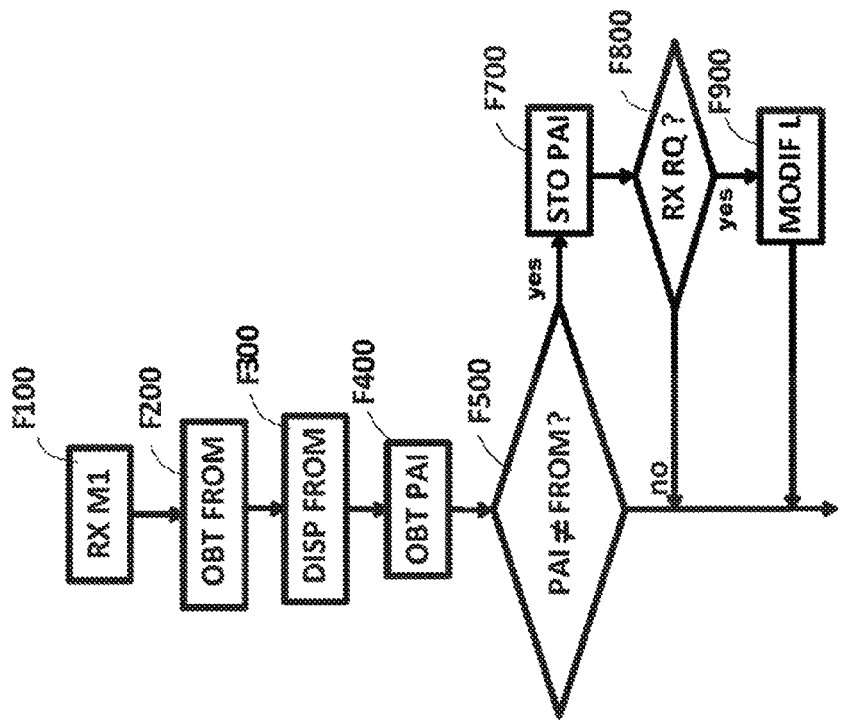
FIG. 5 shows, in flowchart form, the main processes of a method for updating a filtering list in an alternative embodiment in which the list is a blacklist.

We will now describe, in reference to FIG. 5, the main processes of a method for updating the filtering list L.

It will be recalled that this list, primarily used to filter the communication, may also be used as a parameter for notification to the user of the degree of certification of this communication.

In this embodiment, the method is implemented, during the reception, by the device 8, of a telephone call emitted by the user U2.

During a process F100, the update device 8 receives, via the filtering device 1, the call sent by the communication terminal 5 of the user U2 to the terminal 2 of the user U1.

In other words, the signal message M1 has not been blocked by the filtering device 1.

In the example considered here, the message M1 therefore includes:

a PAI (P_Asserted_Id) field according to the SIP protocol, this field including an identifier certified by the operator of the network 4 whereof the value (01 23 45 00) corresponds to the number of the physical line (i.e., the switchboard number) connecting the call center to the communication network 4; and a FROM field including an identifier not certified by the operator of the network 4 and whereof the value 03 45 67 89 has been configured by the PBX equipment 6 of the call center.

Upon reception of the message M1 (process F100), the device 8 extracts (process F200) the identifier contained in the FROM field from the message M1 and presents (process F300) this value to the user U1 by displaying it on a screen of the recipient terminal 2.

The device 8 also extracts (process F400) the certified identifier contained in the PAI field from the message M1.

The device 8 compares (process F500) the value of the certified identifier contained in the PAI field with the value of the non-certified identifier contained in the FROM field.

If, as is the case in the example described here, the certified PAI identifier is different from the noncertified FROM identifier (yes response in process F500), the device 8 saves the certified identifier associated with the noncertified identifier (process F700) in the non-volatile memory 8D of the device 8.

In the example described here, the user U1 decides to take the call and discovers that it is a call from a call center from which he no longer wishes to receive calls in the future.

The user U1 then consults the log of calls from the terminal 2, selects the call he has just received from the FROM identifier displayed to him and sends a request RQ (for example, by selecting a menu in the user interface of the terminal 2) to the device 8 updating the blacklist L, this request RQ indicating that he no longer wishes to receive telephone calls from this caller.

During a process F900, upon receiving the request RQ, the update device 8 adds the certified PAI identifier to the blacklist L, associated with the noncertified FROM identifier that was previously saved in process F700 in the nonvolatile memory 8D.

Alternatively, during process F900, the update device 8 also adds, to the blacklist L, associated with the certified PAI identifier, an indication according to which the certified PAI identifier is used to filter communications of the telephone call type.

The device 8 for updating the list L may be incorporated in the terminal 2, in the residential gateway 3 or in a piece of equipment of the communication network 4.

Figure 2:
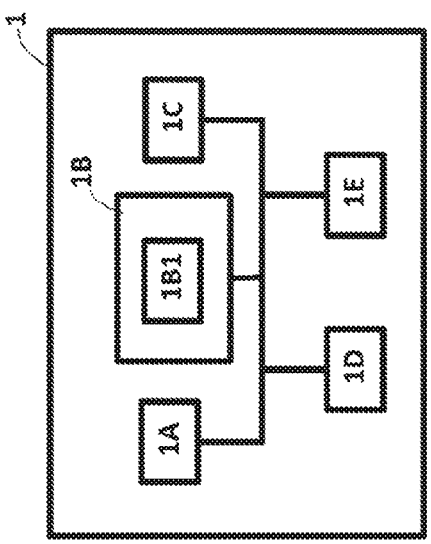
FIG. 2 illustrates one exemplary hardware architecture of the processing device of FIG. 1.

In these embodiments, the filtering device 1 has the hardware architecture of a computer, as diagrammatically illustrated in FIG. 2.

Thus, the filtering device 1 in particular includes a processor 1A, a read-only memory 1B, a random-access memory 1C, a non-volatile memory 1D and communication means or components 1E. The processor 1A, the memories 1B-1D and the communication means or components 1E may optionally be shared with corresponding means or components of the communication terminal 2.

The read-only memory 1B of the filtering device 1 constitutes a recording medium readable by the processor 1A and on which a computer program as described herein is recorded, including instructions for carrying out processes of a processing method as described herein, the processes of this processing method being described in reference to FIG. 3, in one particular embodiment.

This computer program provides an equivalent definition of a functional processing module 1B 1 of the processing device 1. This module in particular makes it possible to perform filtering and/or notification functions, these functions being described in more detail in reference to the processes of the processing method illustrated in FIG. 3.

Figure 4:
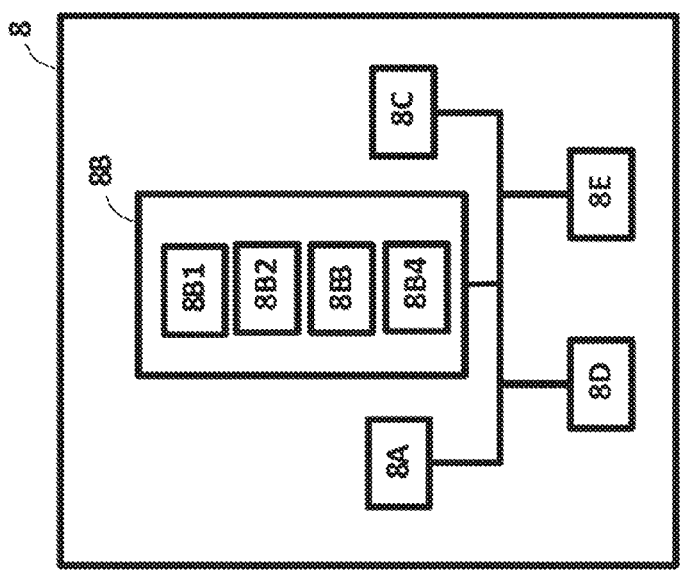
FIG. 4 illustrates an exemplary hardware architecture of the update device of FIG. 1.

In these embodiments, the device 8 for updating a list (terminal, residential gateway 3 or server) has the hardware architecture of a computer, as diagrammatically illustrated in FIG. 4.

Thus, the list updating device 8 in particular includes a processor 8A, a read-only memory 8B, a random-access memory 8C, a non-volatile memory 8D and communication means or components 8E. The processor 8A, the memories 8B-8D and the communication means or components 8E may optionally be shared with corresponding means or components of the communication terminal 2.

The read-only memory 8B of the list updating device constitutes a recording medium readable by the processor 8A and on which a computer program as described herein is recorded, including instructions for carrying out processes of a method for updating a filtering list as described herein, the processes of this list updating method being described later in reference to FIG. 5, in one particular embodiment.

This computer program defines, in an equivalent manner, functional modules of the list updating device 8, in particular such as a module 8B1 for receiving a communication intended for the recipient terminal 2, a module 8B2 for obtaining at least a certified identifier and a noncertified identifier of the caller at the source of the communication from a signal message of the communication, a module 8B3 for saving said at least one certified identifier associated with a noncertified identifier of the caller present in the signal of the call, and a module 8B4 for adding said at least one certified identifier associated with the noncertified identifier to the list L. The addition module 8B4 is activated upon request by a user U1 of the recipient terminal 2. The receiving module 8131 in particular uses the communication means 8E. The functions of these modules are described in more detail in reference to the processes of the method for updating a list illustrated in FIG. 5.

Other Embodiments

Some embodiments seek to identify the communications to be filtered, i.e., those which must be conveyed to a given terminal and those which must be blocked, and to inform the user of the degree of certification of the calling number.

The blocking and routing of communications are mechanisms known by those skilled in the art and which differ depending on the entity implementing them.

In the embodiment previously described, the filtering is carried out within a terminal, this terminal being configured to cancel the presentation of the call to the terminals identified in the blacklist as not wishing to receive that call.

Alternatively, some embodiments may be implemented in the residential gateway 3. In this case, the gateway may block the call for all of the terminals bearing the same identity connected behind the gateway and optionally authorize or not authorize other terminals sharing the same public identity used in roaming mode to continue to ring by sending a SIP 4XX or SIP 6XX rejection code.

Alternatively, the filtering may be done by a piece of equipment of the network, for example an application server AS. In this case, the filtering applies to all of the terminals identically.

To apply the filtering as a function of a terminal sharing a public identity with other terminals:

The INVITE incoming call (FROM, PAI, TO) is sent from the S-CSCF to the application server AS, which manages the calls received by the shared public identity;

The AS verifies the called terminals that have positioned a call filter for the pair of PAI/FROM certified/noncertified identifiers comprised in the INVITE message;

The AS then returns a SIP INVITE message to the S-CSCF, the INVITE message being enriched with the SIP RejectContact header and leveraged with the AoC contact address (including the GRUU or IMEI of the terminal) of the terminal(s) having configured the certified identifier of the caller in their blacklist;

The S-CSCF then initiates its forking mechanism only toward the terminals whereof the AoC is not present in the RejectContact of the INVITE received from the AS. If no RejectContact is positioned, all of the terminals receive a SIP INVITE message sent by the S-CSCF via the P-CSCF.

To identify one terminal from among a set of terminals sharing the same SIP public identity, it is possible to use the IMEI (International Mobile Equipment Identifier) of the terminal, or when the terminal does not have a SIM card, a temporary identifier of the "GRUU" type as standardized at the IETF, generated by the S-CSCF and communicated to the terminal when it is registered in the network.

This unique GRUU identifier must then be communicated to the network entity responsible for the filtering, for example using an HTTP request.

According to a first alternative of this particular embodiment, a blacklist L is associated with each terminal and identified from an identifier of the terminal. The update of such a list may be done using the update method described in reference to FIG. 5.

This blacklist L may also be comprised in a network database that the terminal can access via an Internet IP link.

According to a second alternative of this particular embodiment, the blacklist L is associated with the public identity shared by the terminals. Such a blacklist L comprises an identifier of the terminals associated with the certified identifiers for which the terminals wish to block the communications. The update of such a blacklist L may be done using the update method described in reference to FIG. 5 by adding, to the list L, associated with the certified identifier, the identifier of the terminal 2 or 2' that initiated the request in process F800.

Detailed Description of Another Embodiment

In this particular embodiment, the list L is a white list, such that only the calls whose certified identifiers are registered in the list L are presented to the user of the terminal 2.

One embodiment of this method may be described by presenting its differences with respect to the blacklist-based filtering method described in reference to FIG. 3.

After receiving the call signal message M1 in process E100, extracting the certified identifier of the caller from the PAI field of the message M1 in process E200, the device 1 compares (process E510) this certified PAI identifier with the certified identifiers listed in the white list L.

In this embodiment, the device 1 sends the message M1 to the terminal 2 so that the call will be displayed to the user of the receiving terminal 2 only if the PAI identifier corresponds to a certified identifier listed in the white list.

In this embodiment, the white list may initially be built using a process other than the processes described herein. The user may also add or remove certified identifiers by using a menu of his terminal.

Some embodiments also make it possible to offer a user the possibility of deleting a certified identifier from the white list on request after the call has been presented to him.

Furthermore, in one embodiment, during the notification process, if the FROM and PAI identifiers are different, it is possible to use display and ring tone rules that are different depending on whether the pair of FROM and PAI identifiers is available in the white list.

This in particular makes it possible to manage the communications sent from companies or call centers with whom one wishes to establish a relationship, but for which the FROM identifier is not necessarily identical to the PAI identifier.

Other Embodiments

In the first two embodiments outlined above, the processing device carries out a filtering sub-process (E520, E530) based on the comparison (E400) of the certified PAI identifier with the noncertified FROM identifier and whether the PAI identifier belongs (E510) to a list containing certified identifiers of senders associated with noncertified identifiers of those senders.

In another embodiment, the processing device does not perform a filtering sub-process, but only a notification process (E550) carried out based on the PAI and FROM identifiers making it possible to inform the user of the degree of certification of the communication to allow him the choice of whether to accept or reject the communication himself.

In the first two embodiments outlined above, the reliability information is a certified identifier comprised in a signal message of the communication.

In another embodiment, the certified PAI identifier is not presented at the time of the communication, for example when the equipment is of an old generation. In this case, the processing method may be identical to the case where the noncertified identifier is different from an identifier certified by the operator.

When the mobile network is made using 2G/3G circuit technology, the PAI is not provided to the terminal.

In an embodiment where the communication is under 4G coverage and switches temporarily to a 2G/3G mobile network, the processing process is interrupted. Alternatively, if this switch occurs, the reliability information used in the method comes from a reliability database of the previous communications done under 4G coverage and processed with their PAI identifiers.

In another embodiment, the reliability information used during the processing method is provided by the network via a call signal field not yet used. The comparison of this reliability information with the noncertified FROM identifier is then executed by the MSC (Mobile Switch Center), and the terminal recovers the result of this comparison.

In another embodiment, this reliability information is provided by the terminal by the telephone application server TAS of the backbone either via a call signal field that has not yet been used, or via a notification platform of the Apple APNS/Google C2M/Microsoft type.

What is claimed is:

1. A processing method for a communication intended for a receiving terminal, comprising:
    receiving, by the receiving terminal, a communication intended for the receiving terminal;
    obtaining, by the receiving terminal, from a signal message associated with the communication, a certified identifier and an uncertified identifier of a sender of the communication, the signal message indicating that a transmitting terminal wishes to establish a telephone call with the receiving terminal, wherein the certified identifier is an identifier of the sender whose value and integrity are guaranteed by an operator of a network through which the communication passes;
    comparing, by the receiving terminal, said certified identifier with said uncertified identifier; and
    processing, by the receiving terminal, said communication based on said comparing, wherein said processing comprises:
        if the value of the certified identifier is different than the value of the uncertified identifier, searching for the certified identifier in a list containing pairs of certified identifiers and associated uncertified identifiers and notifying a user of the receiving terminal of the communication unless the certified identifier is found in the list; and
        if the value of the certified identifier is identical to the value of the uncertified identifier, notifying the user of the receiving terminal of the communication.

2. The processing method according to claim 1, wherein said processing includes filtering said communication.

3. The processing method according to claim 1, wherein said processing includes:
    providing notification of at least one characteristic of said communication as a function of said comparing and/or said searching process.

4. The method according to claim 1, wherein said certified identifier is a P_Asserted_Id certified identifier according to the SIP (Session Initiation Protocol) protocol or an NDI (Installation Designation Number) identifier according to the ISDN (Integrated Services Digital Network) protocol.

5. The processing method according to claim 1, wherein the uncertified identifier is an identifier of the sender whose value and integrity are not guaranteed by an operator of a network through which the communication passes.

6. The processing method according to claim 1, wherein the uncertified identifier is a from identifier according to the SIP (Session Initiation Protocol) protocol.

7. The processing method according to claim 1, wherein the signal message is a SIP INVITE message or an ISUP call signaling message.

8. A method for updating a list for communications intended for a receiving terminal, said method comprising:
    receiving, by the receiving terminal, a communication intended for the receiving terminal;
    obtaining, by the receiving terminal, from a signal message associated with the communication, a certified identifier and an uncertified identifier of a sender of the communication, the signal message indicating that a transmitting terminal wishes to establish a telephone call with the receiving terminal, wherein the certified identifier is an identifier of the sender whose value and integrity are guaranteed by an operator of a network through which the communication passes;
    comparing, by the receiving terminal, the value of said certified identifier with the value of said uncertified identifier;
    processing said communication including searching for said certified identifier in a list containing pairs of certified identifiers and associated uncertified identifiers, said processing being based on the results of said comparing and said searching; and
    on a request by a user, adding or deleting from the list said certified identifier associated with said uncertified identifier.

9. The method according to claim 8, wherein said request follows a presentation of said uncertified identifier to the user.

10. The method according to claim 8, wherein said list includes:
    a white list containing pairs of uncertified identifiers and associated certified identifiers identifying senders whose communications intended for said receiving terminal must be sent to said receiving terminal; or
    a blacklist containing pairs of uncertified identifiers and associated certified identifiers identifying senders whose communications intended for said receiving terminal must be blocked.

11. The method according to claim 8, wherein said adding also comprises adding information on a type of said communication in association with said certified and uncertified identifiers.

12. The method according to claim 8, wherein said list is a blacklist and wherein said adding is only carried out if said certified identifier is different from said uncertified identifier.

13. A non-transitory computer-readable medium having stored thereon instructions which cause a computer to perform the method for updating a list according to claim 8 when said instructions are executed by said computer.

14. A non-transitory computer-readable medium having stored thereon instructions which cause a computer to perform the method for processing a communication according to claim 1 when said instructions are executed by said computer.

15. A receiving terminal comprising a processor configured to:
    receive a communication intended for the receiving terminal;

obtain, from a signal message associated with the communication, a certified identifier and an uncertified identifier of a sender of said communication, the signal message indicating that a transmitting terminal wishes to establish a telephone call with the receiving terminal, wherein the certified identifier is an identifier of the sender whose value and integrity are guaranteed by an operator of a network through which the communication passes;

compare said certified identifier with said uncertified identifier;

if the value of the certified identifier is different than the value of the uncertified identifier, search for the certified identifier in a list containing pairs of certified identifiers and associated uncertified identifiers and notify a user of the receiving terminal of the communication unless the certified identifier is found in the list; and if the value of the certified identifier is identical to the value of the uncertified identifier, notify the user of the receiving terminal of the communication.

16. A user device comprising a receiving terminal according to claim 15.

17. A receiving terminal comprising a processor configured to:

receive a communication intended for the receiving terminal;

obtain, from a signal message associated with the communication, a certified identifier and an uncertified identifier of a sender at the source of said communication, the signal message indicating that a transmitting terminal wishes to establish a telephone call with the receiving terminal, wherein the certified identifier is an identifier of the sender whose value and integrity are guaranteed by an operator of a network through which the communication passes;

comparing, by the receiving terminal, the value of said certified identifier with the value of said uncertified identifier;

processing said communication including searching for said certified identifier in a list containing pairs of certified identifiers and associated uncertified identifiers, said processing being based on the results of said comparing and said searching; and add or delete from said list, on a request by a user, said certified identifier associated with said uncertified identifier.

18. A user device comprising a receiving terminal according to claim 17.

* * * * *